US012738207B2

(12) United States Patent
Yuan et al.

(10) Patent No.: US 12,738,207 B2
(45) Date of Patent: Sep. 15, 2026

(54) DISPLAY PANEL, DRIVING METHOD, AND DISPLAY APPARATUS

(71) Applicant: HKC CORPORATION LIMITED, Shenzhen (CN)

(72) Inventors: Xin Yuan, Shenzhen (CN); Chen Chen, Shenzhen (CN); Xiufeng Zhou, Shenzhen (CN); Pei Xu, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/243,567

(22) Filed: Jun. 19, 2025

(65) Prior Publication Data

US 2025/0391346 A1 Dec. 25, 2025

(30) Foreign Application Priority Data

Jun. 21, 2024 (CN) ......................... 202410816818.4

(51) Int. Cl.
*G09G 3/32* (2016.01)

(52) U.S. Cl.
CPC ..................................... *G09G 3/32* (2013.01)

(58) Field of Classification Search
CPC .. H10K 59/12; H10K 59/121; H10K 59/1216; H10K 59/8052; H10K 59/80521; H10K 59/80522; H10K 59/8051; H10K 59/80515; G09G 3/32; G09G 3/3225; G09G 3/3233
See application file for complete search history.

(56) References Cited

U.S. PATENT DOCUMENTS

2023/0301142 A1 9/2023 Tabatake et al.
2025/0061851 A1* 2/2025 Yuan .................... G09G 3/3233
2025/0072261 A1* 2/2025 Xia ...................... H10K 59/121
2025/0185469 A1* 6/2025 Shin ................. H10K 59/80521

FOREIGN PATENT DOCUMENTS

CN 104064579 A 9/2014
CN 109559679 A 4/2019
CN 111326550 A 6/2020
CN 115472651 A 12/2022
JP 2022123434 A 8/2022

OTHER PUBLICATIONS

Chinese Notification to Grant Patent Right for Invention, Chinese Application No. 202410816818.4, mailed Sep. 30, 2025 (8 pages).

* cited by examiner

*Primary Examiner* — Priyank J Shah

(57) ABSTRACT

A display panel, a driving method, and a display apparatus are provided. The display panel includes multiple light-emitting elements and a driving circuit electrically connected to a pixel anode of each of the multiple light-emitting elements. The driving circuit includes a voltage stabilizing capacitor, which is configured to stabilize a voltage input to the pixel anode and includes a first capacitor and a second capacitor. A first part of the pixel anode and the pixel cathode are oppositely disposed to form two electrode plates of the first capacitor. A second part of the pixel anode extends into the pixel defining layer, and the second part of the pixel anode and the auxiliary cathode are oppositely disposed to form two electrode plates of the second capacitor. The pixel cathode extends to the surface of the pixel defining layer and is connected to the auxiliary cathode.

18 Claims, 4 Drawing Sheets

DISPLAY PANEL, DRIVING METHOD, AND DISPLAY APPARATUS

CROSS REFERENCE TO RELATED APPLICATIONS

The present disclosure claims priority of Chinese Patent Application No. 202410816818.4, filed on Jun. 21, 2024, the entire contents of which are hereby incorporated by reference in their entireties.

TECHNICAL FIELD

The present disclosure relates to the field of display technologies, and in particular to a display panel, a driving method, and a display apparatus.

BACKGROUND

With the development of display panels, an internal compensation circuit in an organic light emitting diode (OLED) display panel is easy to have the problem such as a poor compensation effect and a low yield rate. This is because an application size of the OLED display panel gradually expands from a mobile phone product to a medium-sized product, and a product refresh rate of the OLED display panel increases from 60 Hz to 120 Hz or even higher.

A four transistor two capacitor (4T2C) is served as a simple-structured internal compensation circuit, and in a driving timing of a 4T2C circuit, a compensation stage and a writing stage share the time of one row scan cycle. The higher the refresh rate, the shorter the row cycle time, resulting in insufficient compensation time and a poor compensation effect.

Therefore, in order to further reduce a pixel size and improve the compensation stability of the compensation circuit, it is necessary to further optimize a circuit architecture of the 4T2C.

SUMMARY OF THE DISCLOSURE

According to a first aspect, some embodiments of the present disclosure provide a display panel. The display panel may include a plurality of light-emitting elements and a driving circuit electrically connected to a pixel anode of each of the plurality of light-emitting elements. The each of the plurality of light-emitting elements includes: the pixel anode; a pixel defining layer, configured to cover a surface of a part of the pixel anode and expose a surface of another part of the pixel anode to define a pixel opening; an organic light-emitting layer, disposed on a surface of the pixel anode in the pixel opening; a pixel cathode, disposed on a surface of the organic light-emitting layer in the pixel opening; and an overhang structure, disposed on a surface of the pixel defining layer away from the pixel anode; where the overhang structure includes an auxiliary cathode and an insulating structure, the auxiliary cathode is disposed at a surface of the pixel defining layer away from the pixel anode, and the insulating structure is disposed at a side surface of the auxiliary cathode away from the pixel defining layer; the driving circuit includes a voltage stabilizing capacitor configured to stabilize a voltage input to the pixel anode, and the voltage stabilizing capacitor includes a first capacitor and a second capacitor; a first part of the pixel anode and the pixel cathode are oppositely disposed to form two electrode plates of the first capacitor; a second part of the pixel anode extends into the pixel defining layer, and the second part of the pixel anode and the auxiliary cathode are oppositely disposed to form two electrode plates of the second capacitor; and the pixel cathode extends to the surface of the pixel defining layer and is connected to the auxiliary cathode, and the first capacitor is electrically connected to the second capacitor.

According to a second aspect, some embodiments of the present disclosure provide a driving method. The driving method may be configured to drive the driving circuit according to the second aspect, where the driving method includes: at a reset stage, controlling, by the switch control line of the n-th row, a switching transistor to be turned off, controlling, by the compensation control line of the n-th row, the compensation transistor to be turned off, controlling, by the scanning line of the n-th row, the data writing transistor to be turned off, and controlling, by the reset signal line of the n-th row, the reset transistor to be turned on, such that a control terminal of the driving transistor retains a previous frame voltage and is turned on under the action of the previous frame voltage, the reset voltage is written into the pixel anode of the light-emitting element through the driving transistor, the light-emitting element is reset, and the light-emitting element does not emit light; at a compensation stage, controlling, by the switch control line of the n-th row, the switching transistor to be turned on, controlling, by the compensation control line of the n-th row, the compensation transistor to be turned on, controlling, by the scanning line of the n-th row, the data writing transistor to be turned off, and controlling, by the reset signal line of the n-th row, the reset transistor to be turned off, such that the power supply voltage is written into an input terminal of the driving transistor, the compensation voltage is written into the control terminal of the driving transistor, the driving transistor is controlled to be turned on under the compensation voltage, and the power supply voltage is charged into an output terminal of the driving transistor until a gate-source voltage of the driving transistor approaches a threshold voltage, the driving transistor is turned off, and the light-emitting device does not emit light; at a data writing stage, controlling, by the switch control line of the n-th row, the switching transistor to be turned off, controlling, by the compensation control line of the n-th row, the compensation transistor to be turned off, controlling, by the scanning line of the n-th row, the data writing transistor to be turned on, and controlling, by the reset signal line of the n-th row, the reset transistor to be turned off, such that the data voltage is written into the control terminal of the driving transistor, and the light-emitting element does not emit light; and at a light-emitting stage, controlling, by the switch control line of the n-th row, the switching transistor to be turned on, controlling, by the compensation control line of the n-th row, the compensation transistor to be turned off, controlling, by the scanning line of the n-th row, the data writing transistor to be turned off, and controlling, by the reset signal of the n-th row, the reset transistor to be turned off, such that a driving current is generated by the driving transistor under an action of the data voltage, and the light-emitting element is driven to emit light.

According to a third aspect, some embodiments of the present disclosure provide a display apparatus. The display apparatus may include the display panel according to the embodiment in the first aspect.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings may be obtained based on these drawings without creative work.

DETAILED DESCRIPTION

Figure 1:
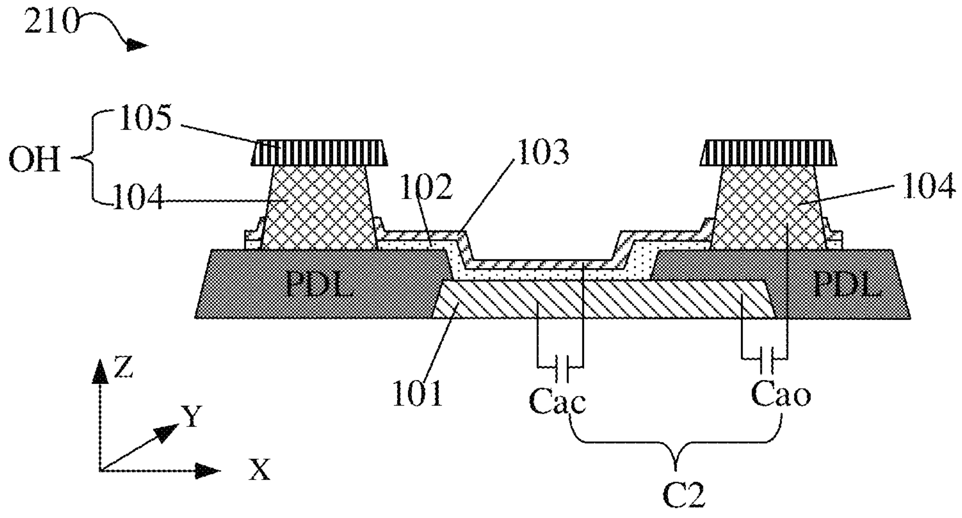
FIG. 1 is a schematic structural diagram of a display panel according to some embodiments of the present disclosure.

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without making creative labor fall within the scope of the present disclosure.

The terms used in the embodiments of the present disclosure are used solely for the purpose of describing particular embodiments and are not intended to limit the present disclosure. The singular forms of "a", "said", and "the" as used in the embodiments of the present disclosure and the appended claims are also intended to include plural form, unless clearly indicated. Terms "a plurality" generally include at least two, but does not exclude the inclusion of at least one.

It should be understood that the term "and/or" as used herein is simply a description of the association of related objects, indicating that three relationships can exist, e.g., A and/or B, which can mean: A alone, both A and B, and B alone. In addition, the character "/" in this document generally indicates that the before and after associated objects are in an "or" relationship. The terms "first", "second", and the like in the description, claims, and aforesaid drawings of the present disclosure are used to distinguish similar objects, rather than describing a particular sequence or order.

It is to be understood that the term "include", "comprise", or any other variant used herein is intended to cover non-exclusive inclusion, such that a process, method, article, or apparatus comprising a set of elements may include not only those elements, but also other elements not explicitly listed, or other elements that are not explicitly listed, or that are inherent to such process, method, article, or apparatus. Without further limitation, elements defined by the statement "including" do not preclude the existence of additional identical elements in the process, method, article, or apparatus that include the elements.

To be noted that, all directional indications (such as up, down, left, right, forward, backward . . . ) in the present disclosure are configured to explain relative positions between components at a particular pose (the pose shown in the accompanying drawings), movements, and so on. When the particular pose changes, the directional indications may change accordingly.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

Figure 5:
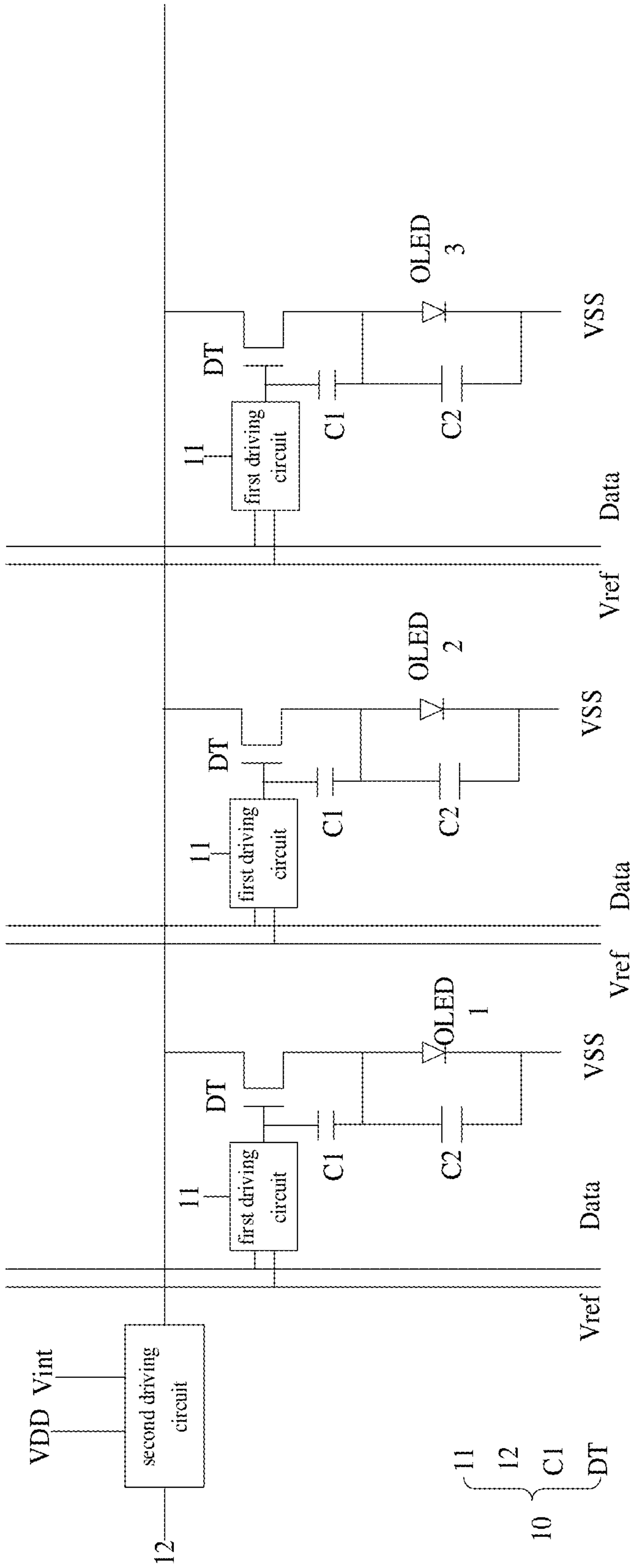
FIG. 5 is a schematic structural diagram of a driving circuit according to some embodiments of the present disclosure.

A display panel may be provided by some embodiments of the present disclosure. FIG. 1 is a schematic structural diagram of a display panel according to some embodiments of the present disclosure. In some embodiments, as shown in FIG. 1, the display panel 210 may include a plurality of light-emitting elements OLED and a driving circuit. The driving circuit may be electrically connected to a pixel anode of each of the plurality of light-emitting element OLED. The driving circuit may be the driving circuit 10 (as shown in FIG. 5) described in any one of the following embodiments, which are not repeated herein.

The driving circuit 10 may include a voltage stabilizing capacitor C2, and the voltage stabilizing capacitor C2 may be configured to stabilize a voltage transmitted to a pixel anode 101. The voltage stabilizing capacitor C2 may include a first capacitor Cac and a second capacitor Cao. The first capacitor Cac may be connected to the pixel anode and a pixel cathode. The second capacitor Cao may be connected to the pixel anode and an auxiliary cathode.

The each of the plurality of light-emitting element OLED may include the pixel anode 101, a pixel defining layer PDL, an organic light-emitting layer 102, a pixel cathode 103, and an auxiliary cathode 104. The pixel defining layer PDL may cover a surface of a part of the pixel anode 101. In addition, the pixel defining layer PDL may expose a surface of another part of the pixel anode 101, such that a pixel opening may be defined. The organic light-emitting layer 102 may be disposed on the surface of the pixel anode 101 in the pixel opening. The pixel cathode 103 may be disposed on the surface of the organic light-emitting layer 102 in the pixel opening. The pixel cathode 103 may be spaced from the pixel anode 101 to form the first capacitor Cac. The auxiliary cathode 104 may be disposed on a surface of the pixel defining layer PDL away from the pixel anode 101, such that the auxiliary cathode 104 may be spaced from the pixel anode 101 to form the second capacitor Cao.

In the embodiments, when the pixel opening reaches the maximum, i.e., an aperture ratio of the pixel opening reaches the maximum, that is, when the first capacitor Cac formed by the pixel anode 101 and the pixel cathode 103 reaches the maximum, the voltage stabilizing ability of the voltage stabilizing capacitor C2 is further improved by increasing a capacitance value of the second capacitor Cao, such that the voltage stability of the pixel anode 101 may be improved.

At least one side of the pixel anode 101 may extend toward the auxiliary cathode 104. The pixel anode 101 may be at least partially overlapped with the auxiliary cathode 104 on a perpendicular projection plane, such that the second capacitor Cao may be formed by the pixel anode 101 and the auxiliary cathode 104. As shown in FIG. 1, the perpendicular projection plane may be referred to an orthographic projection plane, i.e., a plane where a projection direction may be perpendicular to itself. In some embodiments, the perpendicular projection plane may be a horizontal plane, for example, a X-Y plane shown in FIG. 1. In some embodiments, both sides of the pixel anode 101 may extend toward the pixel defining layers PDL disposed on the both sides of the pixel anode 101, such that two second capacitors Cao may be formed by the pixel anode 101 and the auxiliary cathodes 104 disposed on the pixel defining layers PDL disposed on the both sides of the pixel anode 101, respectively. That is, one of the two second capacitors Cao may be formed by the pixel anode 101 and the auxiliary cathode 104 disposed on the pixel defining layer PDL disposed on one of the both sides of the pixel anode 101, and the other one of the two second capacitors Cao may be formed by the pixel anode 101 and the auxiliary cathode 104 disposed on the pixel defining layer PDL disposed on the other one of the both sides of the pixel anode 101. In some embodiments, four sides of the pixel anode 101 may further extend toward the pixel defining layers PDL around the pixel anode 101, which is not limited herein. In some embodiments, a side of the pixel anode 101 may extend toward the auxiliary cathode 104. An extension length of the pixel anode 101 may be greater than half of a length of the pixel defining layer PDL, and the pixel anodes 101 of the plurality of light-emitting elements OLED extend in a same direction. In this way, it may be possible to ensure that a capacitance in each of the plurality of light-emitting elements OLED may be approximately the same. When at least two sides of the pixel anode 101 extend toward the auxiliary cathode 104, the extension length of the pixel anode 101 needs to be less than half of the length of the pixel defining layer PDL, such that the pixel anode 101 and another adjacent pixel anode 101 may be spaced from each other.

In the embodiments, the pixel cathode 103 may extend toward the surface of the pixel defining layer PDL and may be connected to the auxiliary cathode 104 disposed on the surface of the pixel defining layer PDL. In this way, the first capacitor Cac may be electrically connected to the second capacitor Cao, and thus the voltage stabilizing capacitor C2 may be formed. In other embodiments, the first capacitor Cac and the second capacitor Cao may not be connected to each other.

In some embodiments, a height of the pixel anode 101 at a position where the pixel anode 101 is overlapped with the auxiliary cathode 104 on the perpendicular projection plane may be greater than a height of the pixel anode 101 at a position where the pixel anode 101 is overlapped with the pixel cathode 103 on the perpendicular projection plane. That is, the height of the pixel anode 101 may be raised/elevated at the position where the pixel anode 101 is overlapped with the auxiliary cathode 104 on the perpendicular projection plane. It may be possible to reduce a spacing/distance between the pixel anode 101 and the auxiliary cathode 104, such that a spacing between two electrode plates of the second capacitor Cao may be shortened, thereby increasing the capacitance value of the second capacitor Cao.

In some embodiments, a thickness of the pixel anode 101 at a position where the pixel anode 101 is overlapped with the auxiliary cathode 104 on the perpendicular projection plane may be greater than a thickness of the pixel anode 101 at a position where the pixel anode 101 is overlapped with the pixel cathode 103 on the perpendicular projection plane, such that the second capacitor Cao may be increased. In some embodiments, the thickness of the pixel anode 101 at the position where the pixel anode 101 is overlapped with the auxiliary cathode 104 may be increased in a thickening manner.

It should be noted that the height or the thickness of the pixel anode 101 at the position where the pixel anode 101 is overlapped with the pixel cathode 103 on the perpendicular projection plane is a reference value. The reference value may be set according to the light-emitting requirement of the light-emitting element OLED.

In some embodiments, a first anode 1011 and a second anode 1012 may be arranged at the position where the pixel anode 101 is overlapped with the auxiliary cathode 104 on the perpendicular projection plane. The first anode 1011 and the second anode 1012 may be overlapped with each other in a laminating direction. The first anode 1011 is a main anode. The first anode 1011 may be overlapped with each of the pixel cathode 103 and the auxiliary cathode 104 in the laminating direction. The laminating direction may be referred to a direction perpendicular to the perpendicular projection plane. In some embodiments, as shown in FIG. 1, the laminating direction may be referred to a Z-axis direction. The Z-axis direction may be perpendicular to the X-Y plane.

Figure 2:
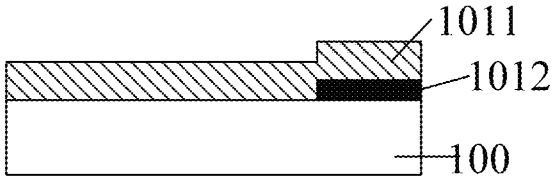
FIG. 2 is a schematic structural diagram of the display panel according to some embodiments of the present disclosure.

As shown in FIG. 2, FIG. 2 is a schematic structural diagram of the display panel according to some embodiments of the present disclosure. In some embodiments, the second anode 1012 may be disposed at a side of the first anode 1011 away from the auxiliary cathode 104, so as to raise/elevate a height of the first anode 1011, and thus a spacing between the first anode 1011 and the auxiliary cathode 104 may be reduced. In this specific embodiment, the second anode 1012 may be made of a non-conductive material, such as resin, or made of a conductive material, which is not limited herein.

Figure 3:
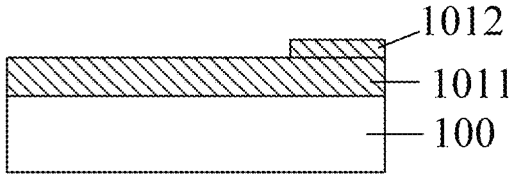
FIG. 3 is a schematic structural diagram of the display panel according to some embodiments of the present disclosure.

As shown in FIG. 3, FIG. 3 is a schematic structural diagram of the display panel according to some embodiments of the present disclosure. In some embodiments, the second anode 1012 may be disposed at a side of the first anode 1011 close to the auxiliary cathode 104. The second anode 1012 may be made of the conductive material. A height of the second anode 1012 may be raised by the first anode 1011, such that it may be a spacing between the second anode 1012 and the auxiliary cathode 104 may be reduced. In the embodiments, a material of the second anode 1012 may be the same as or different from that of the first anode 1011. In some embodiments, the first anode 1011 may be made of a transparent indium tin oxide (ITO) material. The second anode 1012 may be made of an ITO material or an opaque metal material, which is not limited herein. When the material of the second anode 1012 may be the same as that of the first anode 1011, it may be understood that the thickness of the pixel anode 101 at the position where the pixel anode 101 is overlapped with the auxiliary cathode 104 on the perpendicular projection plane may be increased in the thickening manner, which is not provided further examples herein.

Figure 4:
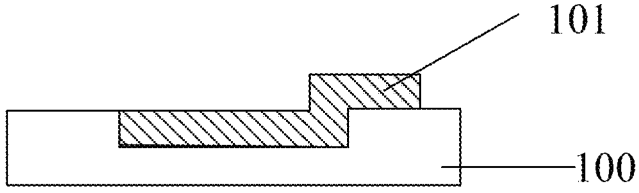
FIG. 4 is a schematic structural diagram of the display panel according to some embodiments of the present disclosure.

In some embodiments, as shown in FIG. 4, FIG. 4 is a schematic structural diagram of the display panel according to some embodiments of the present disclosure. The plurality of light-emitting elements OLED are arranged in an array on a planarization layer 106 of a driving substrate 100. The driving substrate 100 may include an array substrate. Each transistor of the driving circuit 10 may be disposed on the driving substrate 100. The planarization layer 106 may be disposed on the surface of the driving substrate 100. In the above-mentioned embodiments, the pixel anodes 101 of the plurality of light-emitting elements OLED are disposed on a surface of the planarization layer 106 of the driving substrate 100. In some embodiments, a groove 107 may be defined in the planarization layer 106 disposed on the surface of the driving substrate 100. As shown in FIG. 4, a first part of the pixel anode 101 may be disposed in the groove 107 of the driving substrate 100, and a second part of the pixel anode 101 may be disposed on the surface of the groove 107. The pixel anode 101 disposed in the groove 107 may be overlapped with the pixel cathode 103 in the laminating direction to form the first capacitor Cac. The second part of the pixel anode 101 disposed on a surface of the groove 107 may be overlapped with the auxiliary cathode 104 in the laminating direction to form the second capacitor Cao. That is, as shown in FIG. 1, the second part of the pixel anode 101 protruding the surface of the groove 107 may be overlapped with the auxiliary cathode 104 in the laminating direction to form the second capacitor Cao. In some embodiments, two planarization layers 106 may be arranged, the groove 107 may be formed by etching one of the two planarization layers 106 at the top, i.e., the groove 107 may be defined on a surface of a planarization layer 106 at the top, and a specific implementation manner is not limited herein. In the embodiments, the pixel anode 101 disposed on a light-emitting area of the light-emitting element OLED may be moved down through the groove 107 of the driving substrate 100, such that the height of the pixel anode 101 may be raised by a surrounding/peripheral structure of the groove 107.

In the embodiments, an overhang structure OH may be arranged on the pixel defining layer PDL and may be configured to separate adjacent two of the plurality of light-emitting elements. The overhang structure OH may include the auxiliary cathode 104 and an eave layer 105. In some embodiments, as shown in FIG. 1, the cave layer 105 may be an insulating structure disposed at a side surface of the auxiliary cathode away from the pixel defining layer. A width of the eave layer 105 may be greater than that of the auxiliary cathode 104. The width here may be referred to a length in the laminating direction. The width of the eaves layer 105 may be set to be greater than that of the auxiliary cathode 104, such that it may be convenient to manufacture the organic light-emitting layer 102 and the pixel cathode 103 of the light-emitting element OLED by an FMM (maskless) evaporation process. In some embodiments, the organic light-emitting layer 102 may be separated at this position (i.e., the position where the overhang structure OH is disposed) by the overhang structure OH. The organic light-emitting layer 102 may include a red light-emitting layer R, a green light-emitting layer G, a blue light-emitting layer B, etc., which is not limited herein.

In the embodiments, by arranging the overhang structure and combining with the FMM evaporation process to manufacture the light-emitting element OLED, an aperture ratio of the each of the plurality of light-emitting element OLED may be increased, such that it may be increase the capacitance of the first capacitor Cac between the pixel anode 101 and the pixel cathode 103 of the light-emitting element.

In some embodiments, the auxiliary cathode 104 may be connected to the pixel cathodes 103 of adjacent light-emitting elements OLED, such that the auxiliary cathode 104 may be connected to the pixel cathodes 103 of the entire display panel 210, thereby making the pixel cathodes 103 disposed on an entire surface of the display panel 210, i.e., forming a continuous cathode layer of the pixel cathodes 103. The auxiliary cathode 104 may be overlapped with the pixel anode 101 of the light-emitting element OLED in the laminating direction, such that a part of the second capacitor Cao of the voltage stabilizing capacitor C2 may be formed. another part of the first capacitor Cac of the voltage stabilizing capacitor C2 may be formed by the pixel cathode 103 and the pixel anode 101 of the light-emitting element. The voltage stabilizing capacitor C2 may be formed by the second capacitor Cao and the first capacitor Cac.

The capacitance of the voltage stabilizing capacitor C2 may be positively correlated with an overlapping area between the pixel anode 101 of the light-emitting element and the pixel cathode 103 on the perpendicular projection plane, and/or an overlapping area between the pixel anode 101 of the light-emitting element and the auxiliary cathode 104 on the perpendicular projection plane. That is, the capacitance of the voltage stabilizing capacitor C2 may be positively correlated with at least one of a first overlapping area and a second overlapping area. The first overlapping area may be referred to an overlapping area between the pixel anode 101 of the light-emitting element and the pixel cathode 103 on the perpendicular projection plane. The second overlapping area may be referred to an overlapping area between the pixel anode 101 of the light-emitting element and the auxiliary cathode 104 on the perpendicular projection plane. The capacitance of the voltage stabilizing capacitor C2 may be related to the capacitance of the second capacitor Cao and the capacitance of the first capacitor Cac. That is, the capacitance of the voltage stabilizing capacitor C2 may be related to a capacitance of the first capacitor Cac formed by overlapping the pixel anode 101 with the pixel cathode 103 of the light-emitting element OLED on the perpendicular projection plane and a capacitance of the second capacitor Cao formed by overlapping the pixel anode 101 with the auxiliary cathode 104 on the perpendicular projection plane. The capacitance of each of the first capacitor Cac and the second capacitor Cao may be related to an overlapping area between the two electrode plates thereof. That is, the capacitance of the first capacitor Cac may be related to the overlapping area between the two electrode plates of the first capacitor Cac, and the capacitance of the second capacitor Cao may be related to the overlapping area between the two electrode plates of the second capacitor Cao. In some embodiments, the aperture ratio of the light-emitting element may be increased by the FMM-free (i.e., mask-free) evaporation process. That is, the overlapping area between the pixel anode 101 of the light-emitting element and the pixel cathode 103 on the perpendicular projection plane may be increased, such that it may be possible to increase the capacitance of the voltage stabilizing capacitor C2. In another embodiment, the pixel anode 101 of the light-emitting element may also be extended toward the overhang structure OH, such that it may be possible to increase the overlapping area between the pixel anode 101 of the light-emitting element and the auxiliary cathode 104 on the perpendicular projection plane, and thus it may also be possible to increase the capacitance of the voltage stabilizing capacitor C2. The capacitance here may be referred to the amount of charge that the capacitor may be capable of storing. In other embodiments, the overlapping area between the pixel anode 101 and the pixel cathode 103 on the perpendicular projection plane and the overlapping area between the pixel anode 101 and the auxiliary cathode 104 on the perpendicular projection plane may be increased simultaneously, which is not limited herein.

A driving circuit may be provided by some embodiments of the present disclosure. As shown in FIG. 5, FIG. 5 is a schematic structural diagram of a driving circuit according to some embodiments of the present disclosure. In some embodiments, as shown in FIG. 5, the driving circuit 10 may include a light-emitting element OLED, a driving circuit 10, and a voltage stabilizing capacitor C2. The driving circuit 10 may be electrically connected to the pixel anode of the light-emitting element OLED. The voltage stabilizing capacitor C2 may be configured to stabilize a voltage input from the driving circuit 10 to the pixel anode of the light-emitting element OLED. A first electrode plate of the voltage stabilizing capacitor C2 may be electrically connected to an output terminal of the driving circuit 10 and the pixel anode of the light-emitting element OLED. A second electrode plate of the voltage stabilizing capacitor C2 may be electrically connected to the pixel cathode of the light-emitting element OLED and the auxiliary cathode.

In some embodiments, the driving circuit 10 may include a first driving circuit 10 11 and a second driving circuit 10 12. The first driving circuit 10 11 may be electrically connected to each light-emitting element OLED. The second driving circuit 10 12 may be electrically connected to the plurality of light-emitting elements OLED at the same time. The driving circuit 10 may include at least one driving transistor DT. An output terminal of each driving transistor DT may be connected to the pixel anode of each light-emitting element OLED. A control terminal of the each driving transistor DT may be connected to each first driving circuit 10 11. Input terminals of the plurality of driving transistors DT may be connected to one second driving circuit 10 12. In some embodiments, a plurality of sub-pixels in a same row may be connected to a same second driving circuit 10 12. Alternatively, all of sub-pixels in an entire row may be connected to a same second driving circuit 10 12. Each of the sub-pixels may include a light-emitting element. In some embodiments, one second driving circuit 10 12 may be shared by three sub-pixels (i.e., a pixel unit). On the one hand, compared with a scheme in which a single sub-pixel requires one second driving circuit 10 12, a circuit design of the single sub-pixel may be simplified, such that it may be conducive to increasing the aperture ratio of the single sub-pixel. On the other hand, compared with a scheme in which the second driving circuit 10 12 may be shared by all of sub-pixels in a row, it may be possible to reduce a problem that it is necessary to additionally increase the width of a power supply line VDD to prevent burnout and poor signal transmission due to an excessive load of a single power supply line VDD.

Figure 6:
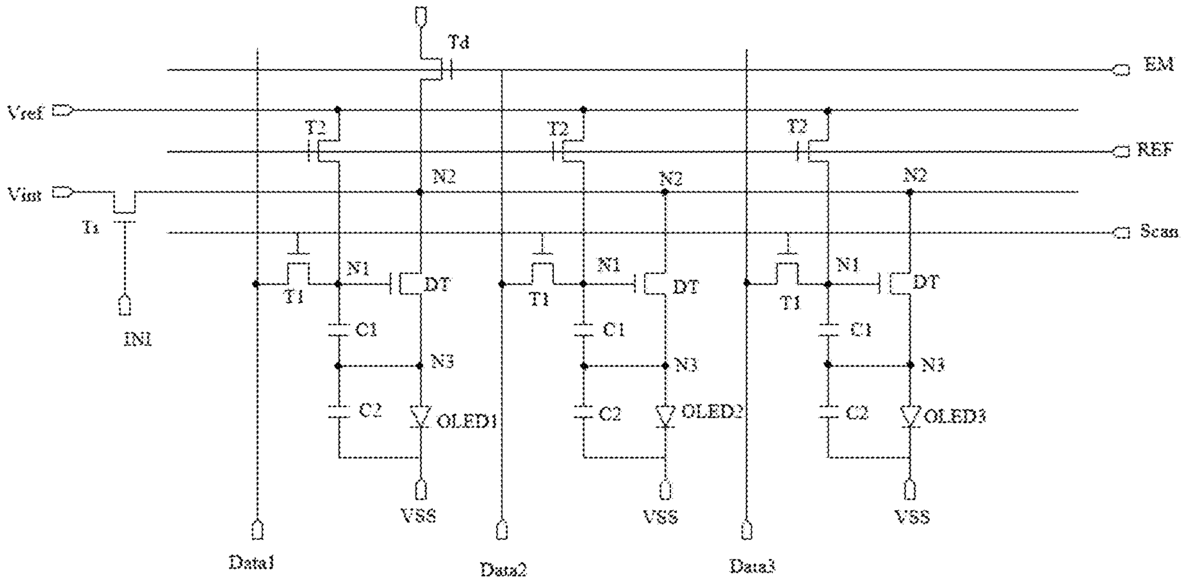
FIG. 6 is a schematic structural diagram of the driving circuit according to some embodiments of the present disclosure.

As shown in FIG. 6, FIG. 6 is a schematic structural diagram of the driving circuit according to some embodiments of the present disclosure. In some embodiments, the first driving circuit 10 11 may include a data writing circuit connected to a control terminal of the driving transistor DT. The data writing circuit may be configured to write a data voltage.

In some embodiments, the data writing circuit may include a data writing transistor T1. A control terminal of the data writing transistor T1 may be connected to a scanning line Scan. An input terminal of the data writing transistor T1 may be connected to a data line Data. An output terminal of the data writing transistor T1 may be connected to the control terminal of the driving transistor DT. At a data writing stage, a data voltage Vdata may be written to the control terminal of the driving transistor DT through the data writing transistor T1, such that it may be possible to control a current input to the light-emitting element OLED, thereby controlling a light-emitting brightness of the light-emitting element OLED. In some embodiments, the data writing circuit may also include other multiple data writing transistors, which is not limited herein.

In some embodiments, the first driving circuit 10 11 may further include a compensation circuit. In some embodiments, the compensation circuit may include a compensation transistor T2 and a storage capacitor C1. In some embodiments, a control terminal of the compensation transistor T2 may be connected to a compensation control line REF. An input terminal of the compensation transistor T2 may be connected to a compensation signal line ref. An output terminal of the compensation transistor T2 may be connected to the control terminal of the driving transistor DT, and may be configured to input a compensation voltage Vref to the control terminal of the driving transistor DT. A first electrode plate of the storage capacitor C1 may be connected to the control terminal of the driving transistor DT. A second electrode of the storage capacitor C1 may be connected to an output terminal of the driving transistor DT.

It should be noted that the driving transistor DT provided by the embodiments of the present disclosure may be an N-type transistor. The control terminal of the driving transistor DT may be a gate. The output terminal of the driving transistor DT may be a source. An input terminal of the driving transistor DT may be a drain. A driving current flowing through the driving transistor DT may be related to a driving voltage of a gate-source voltage VGS of the driving transistor DT, that is, the driving current may be related to a voltage difference between a N1 node and a N3 node.

In the embodiments, the gate of the driving transistor DT is connected to the source of the driving transistor DT through the storage capacitor C1, such that a voltage including a threshold voltage of the driving transistor DT may be charged/input into the gate of the driving transistor DT. In this way, when the driving transistor DT is configured to drive the light-emitting element OLED to emit light, the driving transistor DT is not affected by the drift of the threshold voltage of the driving transistor DT itself, such that the stability of the display brightness may be improved.

In other embodiments, the compensation voltage including the threshold voltage may also be charged into the gate of the driving transistor DT through other compensation circuits. For example, the compensation voltage may be directly charged through the data line Data, etc., which is not limited herein. It should be noted that the embodiments in the present disclosure are all preferred embodiments of the present disclosure, not limiting embodiments.

In some embodiments, the second driving circuit 10 12 may include a switching circuit configured to control the light-emitting element OLED to emit light. In some embodiments, the switching circuit may include a switching transistor Td. A control terminal of the switching transistor Td may be connected to a switch control line EM. An input terminal of the switching transistor Td may be connected to the power supply line VDD. An output terminal of the switching transistor Td may be connected to the input terminals of the plurality of driving transistors DT, and may be configured to control whether the driving transistor DT is configured to drive the light-emitting element OLED to emit light and when the light-emitting element OLED is driven to emit light. In some embodiments, at a light-emitting stage, a voltage may be input to the input terminal of the driving transistor DT through the switching circuit, such that a voltage difference may be generated between the input terminal of the driving transistor DT and the output terminal of the driving transistor DT, and thus the driving transistor DT may be controlled to drive the light-emitting element OLED to emit light. In the embodiments, at the compensation stage, the switching circuit may be also in a conducting state. The input terminal of the driving transistor DT may be connected to the power supply line through the switching circuit, such that there may be a voltage difference between the source of the driving transistor DT and the drain of the driving transistor DT, and thus there may be a current flowing. In this case, an output terminal N3 of the driving transistor DT may be charged or discharged through an input terminal N2 of the driving transistor DT, such that a voltage of the output terminal N3 (i.e., the source of the driving transistor DT) of the driving transistor DT may include a threshold voltage Vth, such that it may be possible to enable the driving transistor to implement voltage compensation. It should be noted that the input terminal and the output terminal provided in some embodiments of the present disclosure do not limit a flow direction of the current. In some embodiments, when a voltage of the output terminal is greater than that of the input terminal, reverse charging may occur, that is, the voltage of the output terminal may flow to the input terminal.

In other embodiments, other circuits may also be configured to control when the light-emitting element OLED is driven to emit light, which is not limited herein.

In some embodiments, the second driving circuit 10 may include a reset circuit configured to reset the pixel anode of the light-emitting element OLED. In some embodiments, the reset circuit may include a reset transistor Ti. A control terminal of the reset transistor T1 may be connected to the reset control line INI. An input terminal of the reset transistor T1 may be connected to a reset signal line int. An output terminal of the reset transistor T1 may be connected to the input terminals of the plurality of driving transistors DT, such that a reset signal Vint may be charged into the pixel anode of the light-emitting element OLED through the driving transistor DT. In some embodiments, at a reset stage, the reset signal may be input to the input terminals of the plurality of driving transistors DT through the reset transistor Ti. At the same time, the driving transistor DT remains in a conducting state under the influence of a previous frame voltage, such that the reset voltage Vint of the reset signal line int may be output from the input terminal of the driving transistor DT to the output terminal of the driving transistor DT, and thus the reset voltage Vint may be output to the pixel anodes of the plurality of light-emitting elements OLED.

In some embodiments, the driving circuit 10 may include a data writing circuit, a compensation capacitor, a switching circuit, a reset circuit, etc. That is, the driving circuit 10 may include the plurality of transistors as shown in FIG. 6, and a driving method of the driving circuit 10 may include the reset stage, the compensation stage, the data writing stage, and the light-emitting stage.

Figure 7:
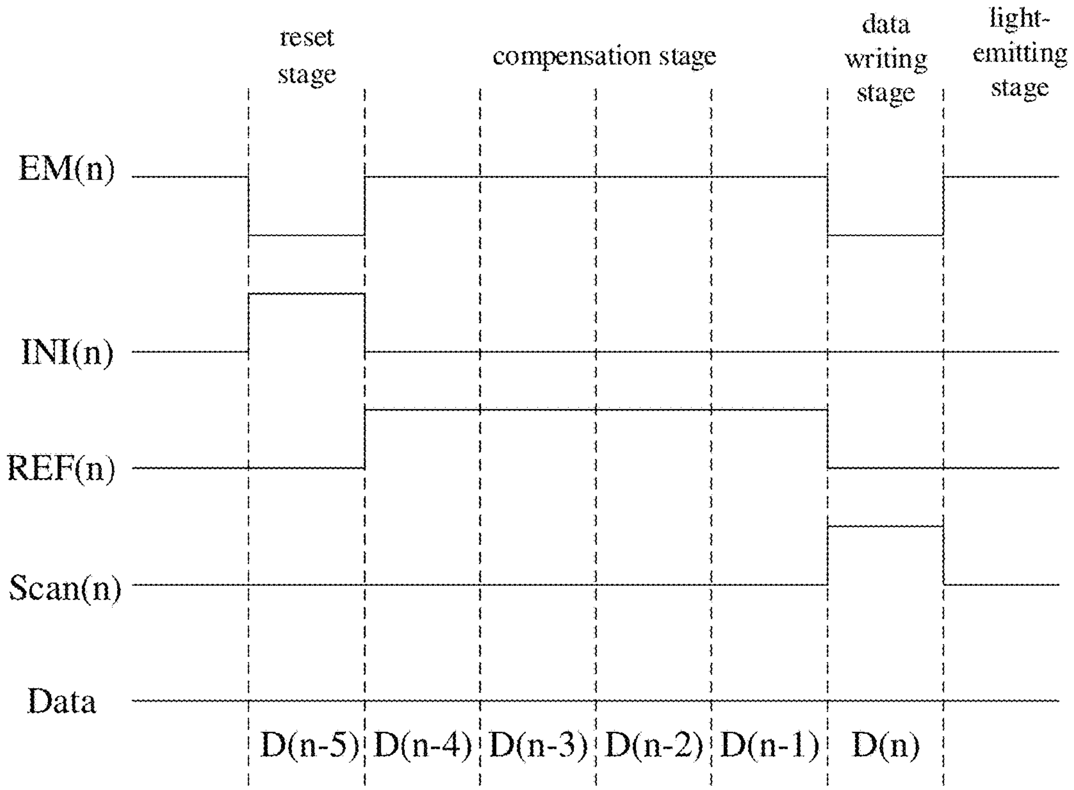
FIG. 7 is a timing control diagram of a driving method for the driving circuit according to some embodiments of the present disclosure.
Figure 8:
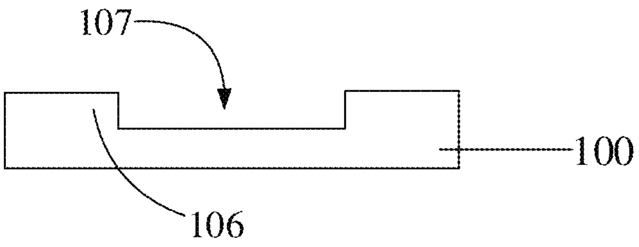
FIG. 8 is a schematic structural diagram of the display panel according to some embodiments of the present disclosure.

As shown in FIG. 7, FIG. 7 is a timing control diagram of a driving method for the driving circuit according to some embodiments of the present disclosure. In some embodiments, the driving circuit 10 may include the driving circuit 10 as shown in FIG. 6.

At the reset stage, the switching transistor Td may be controlled to be turned off by the switch control line EM(n) of the n-th row, the compensation transistor T2 may be controlled to be turned off by the compensation control line REF(n) of the n-th row, the data writing transistor T1 may be controlled to be turned off by the scanning line Scan(n) of the n-th row, and the reset transistor T1 may be controlled to be turned on by the reset signal line INI(n) of the n-th row. At this time, the previous frame voltage may be retained at a N1 node of the control terminal of the driving transistor DT. In addition, since the previous frame voltage is greater than the reset voltage Vint, the driving transistor DT may be turned on, such that the reset voltage Vint on the reset signal line int may be written to a N3 node of the driving transistor DT (i.e., the output terminal of the driving transistor). In this way, it may be possible to reset the pixel anode of the light-emitting element OLED, such that the light-emitting element OLED may not emit light. After the reset stage is completed, a voltage VN3 at the N3 node and the reset voltage Vint may meet the following formula: VN3=Vint.

At the compensation stage, the switching transistor Td may be controlled to be turned on by the switch control line EM(n) of the n-th row, the compensation transistor T2 may be controlled to be turned on by the compensation control line REF(n) of the n-th row, the data writing transistor T1 may be controlled to be turned off by the scanning line Scan(n) of the n-th row, and the reset transistor T1 may be controlled to be turned off by the reset signal line INI(n) of the n-th row. At this time, a voltage of the power supply line VDD may be written to a N2 node of the driving transistor DT (i.e., the input terminal of the driving transistor DT), and the compensation voltage Vref may be written to the N1 node. The compensation voltage Vref may be greater than the voltage at the N3 node, such that the driving transistor DT may be controlled to be turned on, and the N3 node may be charged by power supply line VDD. When the voltage at the N3 node may be increased from the reset voltage Vint at the reset stage to meet the following formula: Vref-Vth, the driving transistor DT may be turned off automatically. At this time, the gate-source voltage VGS of the driving transistor DT may meet the following formula: VGS=VN1−VN3=Vth (where VN1-VN3 may represent a voltage difference between a VN1 and the VN3), and the driving transistor DT may be at a turn-off critical point. A difference of the gate-source voltage VGS of the driving transistor DT may be retained by the compensation capacitor.

At the data writing stage, the switching transistor Td may be controlled to be turned off by the switch control line EM(n) of the n-th row, the compensation transistor T2 may be controlled to be turned off by the compensation control line REF(n) of the n-th row, the data writing transistor T1 may be controlled to be turned on by the scanning line Scan(n) of the n-th row, and the reset transistor T1 may be controlled to be turned off by the reset signal line INI(n) of the n-th row. At the data writing stage, the data voltage Vdata may be written to the N1 node. At the same time, the voltage at the N3 node may be coupled under a capacitive coupling effect, and the coupled voltage at the N3 node may meet the following formula: Vref−Vth+α(Vdata−Vref), where α may meet the following formula: α=C1/(C1+C2). At the data writing stage, the voltage at the N1 node may be changed from the Vref to the Vdata, and a change value of the voltage at the N1 node may meet the following formula: Vdata-Vref. Under the coupling effect of the storage capacitor C1 and the compensation capacitor, the voltage at the N3 node may be changed as the voltage at the N1 node may be changed, and a change value of the voltage at the N3 node may meet the following formula: α(Vdata−Vref). In this case, the voltage at the N3 node may be coupled, and the coupled voltage at the N3 node may meet the following formula: Vref−Vth+α (Vdata−Vref). At this time, the gate-source voltage VGS of the driving transistor DT may meet the following formula: VGS=VN1−VN3=(1−α)(Vdata−Vref)+Vth.

At the light-emitting stage, the switching transistor Td may be controlled to be turned on by the switch control line EM(n) of the n-th row, the compensation transistor T2 may be controlled to be turned off by the compensation control line REF(n) of the n-th row, the data writing transistor T1 may be controlled to be turned off by the scanning line Scan(n) of the n-th row, and the reset transistor T1 may be controlled to be turned off by the reset signal line INI(n) of the n-th row. The driving transistor DT may be in the conductive state under the action of the VGS at the writing stage. By turning on the switching transistor Td, it may be possible to enable the driving transistor DT to generate a driving current I under the action of the VGS. The driving transistor DT and the light-emitting element OLED may be connected in series for voltage division. In this case, the voltage at the N3 node may be a sum of VSS and VOLED, i.e., VSS+VOLED (where the VOLED is a voltage division of the light-emitting element OLED). Due to the remaining effect of the compensation capacitor, the voltage difference VGS (i.e., VN1−VN3) between the N1 node and the N3 node remains unchanged. Therefore, the voltage at the N1 node may be coupled, and the coupled voltage at the N1 node may meet the following formula: $(1-\alpha)(Vdata-Vref)+VSS+VOLED+Vth$. At this time, the gate-source voltage VGS of the driving transistor DT may meet the following formula: $VGS-(1-\alpha)(Vdata-Vref)+Vth$, that is, the gate-source voltage VGS of the driving transistor DT remains unchanged. At the light-emitting stage, the driving current at the light-emitting element OLED may be equal to the current flowing through the driving transistor DT. In some embodiments, the driving current may meet the following formula: $I=(k/2)(VGS-Vth)^2=(k/2)[(1-\alpha)(Vdata-Vref)]^2$. k may meet the following formula: $k=W\cdot Cox\cdot\mu eff/L$, W may represent a channel width of the driving transistor DT. L may represent a channel length of the driving transistor DT. Cox may represent a capacitance per unit area of a gate dielectric layer of the driving transistor DT. μeff may represent a mobility of a semiconductor material in a channel region of the driving transistor DT. That is, k is a fixed constant.

The technical effects of the embodiments of the present disclosure may be as follows. In one hand, by simplifying a four transistor two capacitor (4T2C) circuit in each sub-pixel into a three transistor two capacitor (3T2C) circuit, a design area of the light-emitting region of the each sub-pixel may be increased. The 3T2C circuit is suitable for the pixel design of an ultra-high pixel number (PPI) product and an under-screen camera area. In other hand, by combining with the mask-less evaporation process, the aperture ratio of the light-emitting element may be increased. In addition, the second electrode plate of the capacitor C2 may be connected to the pixel cathode of the light-emitting element, such that it may be possible to ensure the capacitance of the storage capacitor, and compared with the scheme of forming the second electrode plate of the storage capacitor through metal traces, the layout space of the capacitor in the circuit may also be reduced, that is, the layout space of a metal line/trace (such as the power line).

In some embodiments, on-time of the compensation transistor T2 may be increased, such that maintenance time of the compensation stage may be increased, thereby enabling the compensation of the driving transistor DT to be compensated more sufficient.

Compared with a case in the related art, i.e., the case in which the compensation at the compensation stage is affected by the limitation of the scanning timing on the scanning line Sman, resulting in a situation of insufficient compensation, a separate compensation transistor T2 and a compensation signal line ref may be configured to perform separate compensation for the each sub-pixel in the embodiments of the present disclosure, such that the compensation at the compensation stage may be not limited/restricted by the row-scanning time. In this way, the display uniformity may be improved at different refresh rates, such that an application field of the compensation circuit may be expanded.

It may be understood that when the data voltage is written to sub-pixels of the (N−5)-th row through the scanning line and the data line, the reset voltage is input to sub-pixels of the n-th row. During a period of writing the data voltage into sub-pixels of the (N−4)-th to the (N−1)-th row, the sub-pixels of the n-th row are compensated, such that it may be possible to increase the compensation time for the sub-pixels of the n-th row, to enable the sub-pixels of the n-th row to be compensated more sufficient, and thus it may be suitable for high-refresh-rate display panel 210*s*. In other embodiments, when sub-pixels of the (N−6)-th row start to be scanned, the reset voltage may also be input to the sub-pixels of the n-th row. In addition, when sub-pixels of the (N−5)-th to the (N−1)-th row may be scanned, the sub-pixels of the Nth row may be compensated, such that it may be possible to further increase the compensation time. In addition, in a low-refresh-rate display panel 210, a timing may also be reserved. That is, when the sub-pixels of the (N−1)-th row is scanned, the sub-pixels of the Nth row may be compensated, which is not limited herein.

The pixel circuit architecture may be optimized by some embodiments of the present disclosure. For the single pixel, the capacitor C2 between the node N3 and the power line VDD may be replaced with a capacitor between the node N3 and the VSS. In addition, by combining with the mask-less evaporation process, the aperture ratio and the overlapping area between the anode and the overhang structure OH may be increased, the capacitance of the voltage stabilizing capacitor C2 may be increased without affecting the circuit design. In this way, the stability of the voltage at the N3 node may be improved, such that it may be possible to improve the stability of the driving voltage of an OLED device at the compensation stage and at a display stage.

Figure 9:
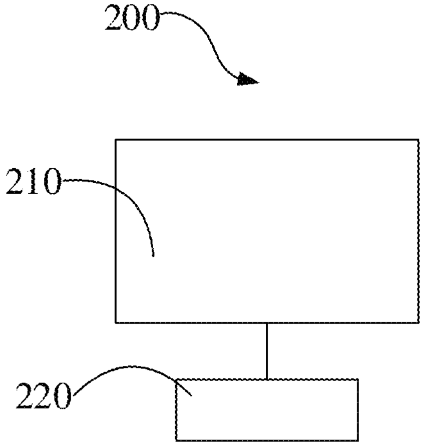
FIG. 9 is a schematic structural diagram of a display apparatus according to some embodiments of the present disclosure.

A display apparatus may be provided by some embodiments of the present disclosure. As shown in FIG. 9, FIG. 9 is a schematic structural diagram of a display apparatus according to some embodiments of the present disclosure. in some embodiments, the display apparatus 200 may include the display panel 210 described in any of the above-mentioned embodiments, which is not repeated herein. The display apparatus 200 may further include a control circuit 220, and the display panel 210 may be connected to the control circuit 220. The display apparatus 200 may be a liquid crystal display (LCD) display device, a light emitting diode (LED) display device, etc.

The technical effect of some embodiments of the present disclosure may be as follows. The second electrode plate of the voltage stabilizing capacitor of the driving circuit 10 may be connected to the pixel cathode of the light-emitting element. In addition, by combining with the mask-less evaporation process, the capacitance between the pixel anode of the light-emitting element and the pixel cathode of the light-emitting element may be increased. Further, by combining with the auxiliary cathode, the capacitance between the pixel anode of the light-emitting element and the auxiliary cathode may be increased, such that the capacitance of the storage capacitor may be increased, thereby improving the stability of the voltage input from the driving circuit 10 to the pixel anode of the light-emitting element.

The above description shows only embodiments of the present disclosure and does not limit the scope of the present disclosure. Any equivalent structure or equivalent process transformation performed based on the specification and accompanying drawings, applied directly or indirectly in other related fields, shall be equally covered by the scope of the present disclosure.

The invention claimed is:

1. A driving method, configured to drive a driving circuit, wherein the driving circuit is applied to a display panel, and the display panel comprises:

a plurality of light-emitting elements and the driving circuit electrically connected to a pixel anode of each of the plurality of light-emitting elements;

the each of the plurality of light-emitting elements comprises:

the pixel anode;

a pixel defining layer, configured to cover a surface of a part of the pixel anode and expose a surface of another part of the pixel anode to define a pixel opening;

an organic light-emitting layer, disposed on a surface of the pixel anode in the pixel opening;

a pixel cathode, disposed on a surface of the organic light-emitting layer in the pixel opening; and an overhang structure, disposed on a surface of the pixel defining layer away from the pixel anode; wherein the overhang structure comprises an auxiliary cathode and an insulating structure, the auxiliary cathode is disposed at a surface of the pixel defining layer away from the pixel anode, and the insulating structure is disposed at a side surface of the auxiliary cathode away from the pixel defining layer; and the driving circuit comprises:

a voltage stabilizing capacitor, configured to stabilize a voltage input to the pixel anode, wherein the voltage stabilizing capacitor comprises a first capacitor and a second capacitor; a first part of the pixel anode and the pixel cathode are oppositely disposed to form two electrode plates of the first capacitor; a second part of the pixel anode extends into the pixel defining layer, and the second part of the pixel anode and the auxiliary cathode are oppositely disposed to form two electrode plates of the second capacitor;

and the pixel cathode extends to the surface of the pixel defining layer and is connected to the auxiliary cathode, and the first capacitor is electrically connected to the second capacitor;

a driving transistor, connected to the pixel anode of each of the plurality of light-emitting elements;

a first driving circuit, connected to an end of each of driving transistors, wherein an input terminal of the first driving circuit is connected to a data line, and the first driving circuit is configured to receive a data voltage and transmit the data voltage to the each of driving transistors;

a second driving circuit, connected to input terminals of a plurality of driving transistors, wherein an input terminal of the second driving circuit is connected to a power supply line, and the second driving circuit is configured to receive a power supply voltage and transmit the power supply to the plurality of driving transistors; and a storage capacitor, a first electrode plate of the storage capacitor being connected to a control terminal of a driving transistor, and a second electrode plate of the storage capacitor being connected to a pixel anode of a corresponding one of light-emitting elements;

wherein the driving method comprises:

at a reset stage, controlling, by a switch control line of the n-th row, a switching transistor to be turned off, controlling, by a compensation control line of the n-th row, a compensation transistor to be turned off, controlling, by a scanning line of the n-th row, a data writing transistor to be turned off, and controlling, by a reset signal line of the n-th row, a reset transistor to be turned on, such that a control terminal of the driving transistor retains a previous frame voltage and is turned on under the action of the previous frame voltage, the reset voltage is written into the pixel anode of the light-emitting element through the driving transistor, the light-emitting element is reset, and the light-emitting element does not emit light;

at a compensation stage, controlling, by the switch control line of the n-th row, the switching transistor to be turned on, controlling, by the compensation control line of the n-th row, the compensation transistor to be turned on, controlling, by the scanning line of the n-th row, the data writing transistor to be turned off, and controlling, by the reset signal line of the n-th row, the reset transistor to be turned off, such that the power supply voltage is written into an input terminal of the driving transistor, a compensation voltage is written into the control terminal of the driving transistor, the driving transistor is controlled to be turned on under the compensation voltage, and the power supply voltage is charged into an output terminal of the driving transistor until a gate-source voltage of the driving transistor approaches a threshold voltage, the driving transistor is turned off, and the light-emitting device does not emit light;

at a data writing stage, controlling, by the switch control line of the n-th row, the switching transistor to be turned off, controlling, by the compensation control line of the n-th row, the compensation transistor to be turned off, controlling, by the scanning line of the n-th row, the data writing transistor to be turned on, and controlling, by the reset signal line of the n-th row, the reset transistor to be turned off, such that the data voltage is written into the control terminal of the driving transistor, and the light-emitting element does not emit light; and at a light-emitting stage, controlling, by the switch control line of the n-th row, the switching transistor to be turned on, controlling, by the compensation control line of the n-th row, the compensation transistor to be turned off, controlling, by the scanning line of the n-th row, the data writing transistor to be turned off, and controlling, by the reset signal line of the n-th row, the reset transistor to be turned off, such that a driving current is generated by the driving transistor under an action of the data voltage, and the light-emitting element is driven to emit light.

2. The driving method according to claim 1, wherein an upper surface of the pixel anode disposed opposite to the auxiliary cathode is higher than an upper surface of the pixel anode disposed opposite to the pixel cathode.

3. The driving method according to claim 2, wherein a thickness of the pixel anode disposed opposite to the auxiliary cathode is greater than a thickness of the pixel anode disposed opposite to the pixel cathode, and the capacitance of the second capacitor is increased.

4. The driving method according to claim 3, wherein the plurality of light-emitting elements are arranged in an array on a planarization layer of a driving substrate, and a groove is defined at a position of the planarization layer corresponding to the pixel opening; and the first part of the pixel anode is disposed in the groove and is disposed opposite to the pixel cathode, and the second part of the pixel anode protrudes above a surface of the groove and is disposed opposite to the auxiliary cathode.

5. The driving method according to claim 2, wherein the pixel anode disposed opposite to the auxiliary cathode comprises a first anode and a second anode, and the first anode is overlapped with the second anode in a laminating direction; and wherein the pixel anode disposed opposite to the pixel cathode comprises the first anode or the second anode.

6. The driving method according to claim 5, wherein the second anode is disposed at a side of the first anode away from the auxiliary cathode, and a distance between the first anode and the auxiliary cathode is reduced; or wherein the second anode is disposed at a side of the first anode close to the auxiliary cathode, a distance between the second anode and the auxiliary cathode is reduced, and the second anode comprises a conductive material.

7. The driving method according to claim 5, wherein the first anode is overlapped with each of the pixel cathode and the auxiliary cathode in the laminating direction, and the laminating direction is perpendicular to the perpendicular projection plane.

8. The driving method according to claim 1, wherein a first electrode plate of the voltage stabilizing capacitor is connected to the second electrode plate of the storage capacitor and the pixel anode of the corresponding one of light-emitting elements, and a second electrode plate of the voltage stabilizing capacitor is connected to the pixel cathode of the corresponding one of light-emitting elements and the auxiliary cathode.

9. The driving method according to claim 1, wherein the first driving circuit comprises the data writing transistor and the compensation transistor, which are connected to the control terminal of the driving transistor;

a control terminal of the data writing transistor is connected to the scanning line, an input terminal of the data writing transistor is connected to the data line, and an output terminal of the data writing transistor is connected to the control terminal of the driving transistor and is configured to write the data voltage into the driving transistor; and a control terminal of the compensation transistor is connected to the compensation control line, an input terminal of the compensation transistor is connected to a compensation signal line, and an output terminal of the compensation transistor is connected to the control terminal of the driving transistor and is configured to write the compensation voltage comprising the threshold voltage into the driving transistor.

10. The driving method according to claim 1, wherein the second driving circuit comprises the switching transistor and the reset transistor, the switching transistor is configured to control the corresponding one of light-emitting elements to emit light, and the reset transistor is configured to reset the pixel anode of the corresponding one of light-emitting elements;

a control terminal of the switching transistor is connected to the switch control line, an input terminal of the switching transistor is connected to the power supply line, and an output terminal of the switching transistor is connected to the input terminals of the plurality of driving transistors and is configured to control the driving transistor to drive the corresponding one of light-emitting elements to emit light; and a control terminal of the reset transistor is connected to a reset control line, an input terminal of the reset transistor is connected to the reset signal line, an output terminal of the reset transistor is connected to the input terminals of the plurality of driving transistors, and a reset signal is charged into the pixel anode of the corresponding one of light-emitting elements through the driving transistor.

11. The driving method according to claim 1, wherein the driving transistor is an N-type transistor, the control terminal of the driving transistor is a gate, the output terminal of the driving transistor is a source, and the input terminal of the driving transistor is a drain; and the gate of the driving transistor is connected to the source of the driving transistor through the storage capacitor, and a voltage comprising the threshold voltage of the driving transistor is charged into the gate of the driving transistor.

12. The driving method according to claim 1, wherein the auxiliary cathode is overlapped with the pixel anode in a laminating direction, a part of the second capacitor of the voltage stabilizing capacitor is formed, and another part of the first capacitor of the voltage stabilizing capacitor is formed by the pixel cathode and the pixel anode.

13. The driving method according to claim 1, wherein a capacitance of the voltage stabilizing capacitor is positively correlated with at least one of a first overlapping area and a second overlapping area, the first overlapping area is an overlapping area between the pixel anode and the pixel cathode on a perpendicular projection plane, and the second overlapping area is an overlapping area between the pixel anode and the auxiliary cathode on the perpendicular projection plane.

14. The driving method according to claim 1, wherein at least one side of the pixel anode extends toward the auxiliary cathode, the pixel anode is at least partially overlapped with the auxiliary cathode on a perpendicular projection plane, and the second capacitor is formed by the pixel anode and the auxiliary cathode.

15. The driving method according to claim 1, wherein both sides of the pixel anode extend toward pixel defining layers disposed on the both sides of the pixel anode, one second capacitor is formed by the pixel anode and the auxiliary cathode disposed on the pixel defining layer disposed on one of the both sides of the pixel anode, and another second capacitor is formed by the pixel anode and the auxiliary cathode disposed on the pixel defining layer disposed on the other one of the both sides of the pixel anode; or a side of the pixel anode extends toward the auxiliary cathode, and an extension length of the pixel anode is greater than half of a length of the pixel defining layer.

16. The driving method according to claim 1, wherein a height of the pixel anode at a position where the pixel anode is overlapped with the auxiliary cathode on the perpendicular projection plane is greater than a height of the pixel anode at a position where the pixel anode is overlapped with the pixel cathode on the perpendicular projection plane.

17. The driving method according to claim 1, wherein a thickness of the pixel anode at a position where the pixel anode is overlapped with the auxiliary cathode on the perpendicular projection plane is greater than a thickness of the pixel anode at a position where the pixel anode is overlapped with the pixel cathode on the perpendicular projection plane.

18. A display apparatus, comprising a display panel and a control circuit;

wherein the display panel comprises a plurality of light-emitting elements and a driving circuit electrically connected to a pixel anode of each of the plurality of light-emitting elements;

wherein the each of the plurality of light-emitting elements comprises:

the pixel anode;

a pixel defining layer, configured to cover a surface of a part of the pixel anode and expose a surface of another part of the pixel anode to define a pixel opening;

an organic light-emitting layer, disposed on a surface of the pixel anode in the pixel opening;

a pixel cathode, disposed on a surface of the organic light-emitting layer in the pixel opening; and an overhang structure, disposed on a surface of the pixel defining layer away from the pixel anode;

wherein the overhang structure comprises an auxiliary cathode and an insulating structure, the auxiliary cathode is disposed at a surface of the pixel defining layer away from the pixel anode, and the insulating structure is disposed at a side surface of the auxiliary cathode away from the pixel defining layer;

the driving circuit comprises a voltage stabilizing capacitor configured to stabilize a voltage input to the pixel anode, and the voltage stabilizing capacitor comprises a first capacitor and a second capacitor;

a first part of the pixel anode and the pixel cathode are oppositely disposed to form two electrode plates of the first capacitor;

a second part of the pixel anode extends into the pixel defining layer, and the second part of the pixel anode and the auxiliary cathode are oppositely disposed to form two electrode plates of the second capacitor; and the pixel cathode extends to the surface of the pixel defining layer and is connected to the auxiliary cathode, and the first capacitor is electrically connected to the second capacitor;

wherein the display panel is connected to the control circuit;

wherein the driving circuit further comprises:

a driving transistor, connected to the pixel anode of each of the plurality of light-emitting elements;

a first driving circuit, connected to an end of each of driving transistors, wherein an input terminal of the first driving circuit is connected to a data line, and the first driving circuit is configured to receive a data voltage and transmit the data voltage to the each of driving transistors;

a second driving circuit, connected to input terminals of a plurality of driving transistors, wherein an input terminal of the second driving circuit is connected to a power supply line, and the second driving circuit is configured to receive a power supply voltage and transmit the power supply to the plurality of driving transistors; and a storage capacitor, a first electrode plate of the storage capacitor being connected to a control terminal of a driving transistor, and a second electrode plate of the storage capacitor being connected to a pixel anode of a corresponding one of light-emitting elements;

wherein the driving circuit is driven by a driving method, and the driving method comprises:

at a reset stage, controlling, by a switch control line of the n-th row, a switching transistor to be turned off, controlling, by a compensation control line of the n-th row, a compensation transistor to be turned off, controlling, by a scanning line of the n-th row, a data writing transistor to be turned off, and controlling, by a reset signal line of the n-th row, a reset transistor to be turned on, such that a control terminal of the driving transistor retains a previous frame voltage and is turned on under the action of the previous frame voltage, the reset voltage is written into the pixel anode of the light-emitting element through the driving transistor, the light-emitting element is reset, and the light-emitting element does not emit light;

at a compensation stage, controlling, by the switch control line of the n-th row, the switching transistor to be turned on, controlling, by the compensation control line of the n-th row, the compensation transistor to be turned on, controlling, by the scanning line of the n-th row, the data writing transistor to be turned off, and controlling, by the reset signal line of the n-th row, the reset transistor to be turned off, such that the power supply voltage is written into an input terminal of the driving transistor, a compensation voltage is written into the control terminal of the driving transistor, the driving transistor is controlled to be turned on under the compensation voltage, and the power supply voltage is charged into an output terminal of the driving transistor until a gate-source voltage of the driving transistor approaches a threshold voltage, the driving transistor is turned off, and the light-emitting device does not emit light;

at a data writing stage, controlling, by the switch control line of the n-th row, the switching transistor to be turned off, controlling, by the compensation control line of the n-th row, the compensation transistor to be turned off, controlling, by the scanning line of the n-th row, the data writing transistor to be turned on, and controlling, by the reset signal line of the n-th row, the reset transistor to be turned off, such that the data voltage is written into the control terminal of the driving transistor, and the light-emitting element does not emit light; and at a light-emitting stage, controlling, by the switch control line of the n-th row, the switching transistor to be turned on, controlling, by the compensation control line of the n-th row, the compensation transistor to be turned off, controlling, by the scanning line of the n-th row, the data writing transistor to be turned off, and controlling, by the reset signal line of the n-th row, the reset transistor to be turned off, such that a driving current is generated by the driving transistor under an action of the data voltage, and the light-emitting element is driven to emit light.

* * * * *